United States Patent [19]

Ullmann et al.

[11] 4,104,502
[45] Aug. 1, 1978

[54] ELECTRO-EROSION MACHINE TOOL WITH COMPENSATION FOR OPERATING FORCES, AND METHOD OF OPERATION

[75] Inventors: Werner Ullmann, Locarno, Switzerland; Rudolf Panschow, Hannover, Germany

[73] Assignee: A.G. für industrielle Elektronik AGIE, Locarno, Switzerland

[21] Appl. No.: 708,299

[22] Filed: Jul. 26, 1976

Related U.S. Application Data

[63] Continuation-in-part of Ser. No. 588,620, Jun. 19, 1975, abandoned.

[30] Foreign Application Priority Data

Nov. 25, 1974 [CH] Switzerland .................. 15639/74

[51] Int. Cl.² .............................................. B23K 9/16
[52] U.S. Cl. .............................. 219/69 W; 219/69 M
[58] Field of Search ............... 219/69 W, 69 M, 69 R, 219/69 L, 68, 123, 131 F

[56] References Cited

U.S. PATENT DOCUMENTS

| | | | |
|---|---|---|---|
| 3,822,374 | 7/1974 | Ullmann et al. | 219/69 W |
| 3,859,186 | 1/1975 | Ullmann et al. | 219/69 W |
| 3,891,819 | 6/1975 | Ullmann et al. | 219/69 W |
| 4,016,395 | 4/1977 | Bell | 219/69 W |

FOREIGN PATENT DOCUMENTS 142,138 5/1961 U.S.S.R.
395,208 4/1974 U.S.S.R.

OTHER PUBLICATIONS

Panschow, "Effect of Forces in Spark-Erosion Cutting", Jour. of Society of German Engineers, vol. 118, 1976, No. 1, Jan., pp. 13-17.

*Primary Examiner*—Bruce A. Reynolds
*Attorney, Agent, or Firm*—Flynn & Frishauf

[57] ABSTRACT

In a spark erosion machine in which the tool electrode comprises a tensioned flexible wire or tape, machining induced force due, for example, to the magnetic and electric fields induced by the sparks, act on the tool electrode and may cause it to vibrate. To reduce the tendency for such vibration, a compensating signal is passed through the tool electrode or applied between the tool electrode and workpiece so as to produce a magnetic or electric field which compensates for the machining induced forces. The compensating signal is preferably adjustable in magnitude and/or frequency (the latter assuming it is an alternating signal) and the output of the generator which produces it is decoupled from the output of the spark pulse generator. The spark pulse generator and the compensating signal generator may be interdependently synchronized by a synchronizing signal lead connected between them.

14 Claims, 7 Drawing Figures

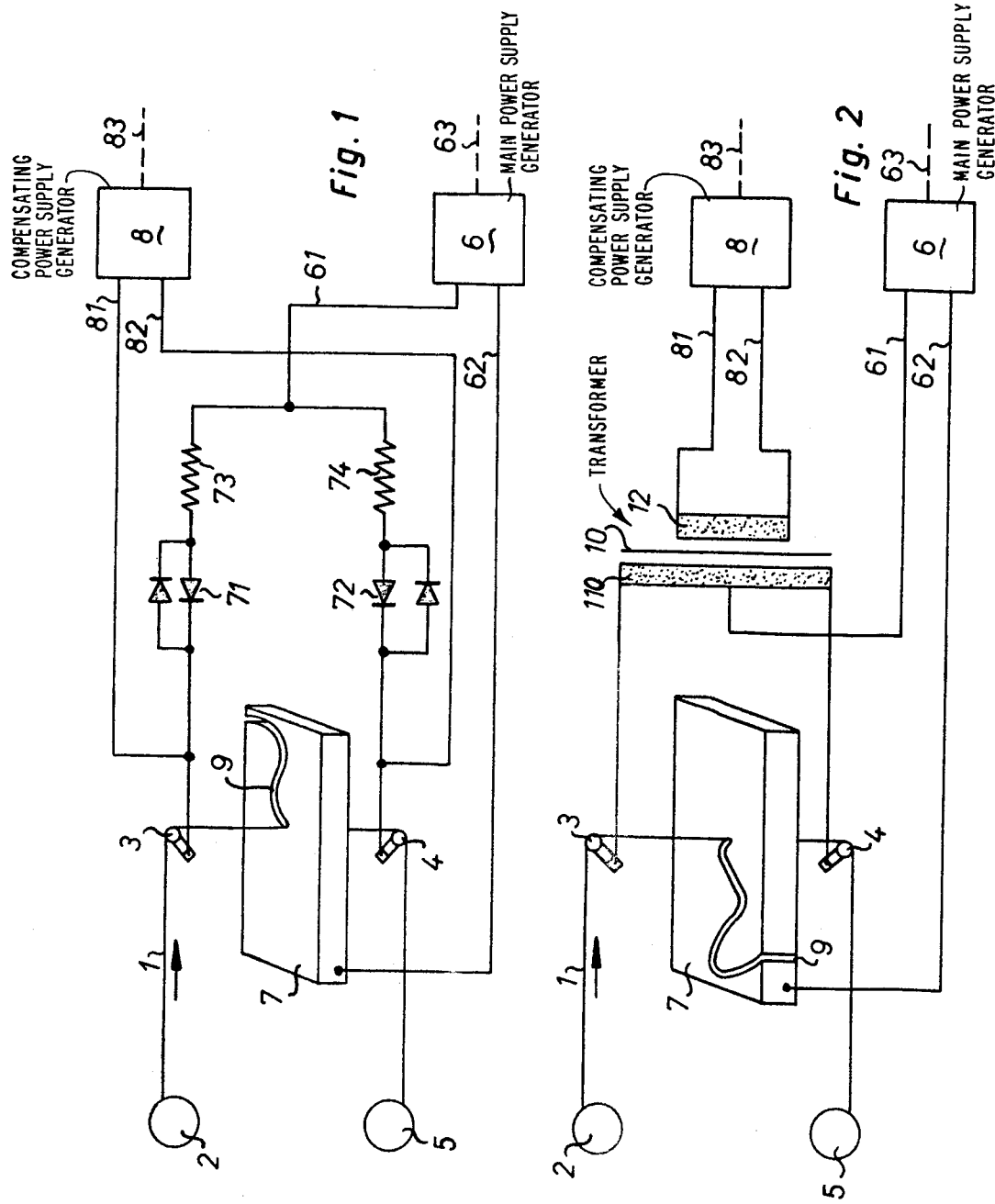

ELECTRO-EROSION MACHINE TOOL WITH COMPENSATION FOR OPERATING FORCES, AND METHOD OF OPERATION

This is a continuation-in-part of our application Ser. No. 588,620, filed June 19, 1975, abandoned.

CROSS REFERENCE TO RELATED PATENTS

U.S. Pat. No. 3,292,040; 3,492,530; 3,655,937; 3,822,374; 3,830,996; 3,859,186; 3,891,819; U.S. Ser. 527,889, Nov. 27, 1974, now U.S. Pat. No. 3,975,607, all assigned to the assignee of the present application. "VDI-Zeitschrift" ("Journal of the Society of German Engineers"), vol. 118, 1976, No. 1 (January), pages 13–17, entitled "Effect of Forces Occurring in Spark-Erosive Cutting" — article by co-inventor Panschow.

The invention relates to electrical discharge erosion machining, and more particularly to methods, and machine tools, for example spark erosion machines, for shaping metallic workpieces by means of a wire-form or strip-form tool electrode which is tensioned by a holding and guiding device and which makes cuts in the workpiece by means of a controlled, relative movement between the two electrodes.

In spark erosion machinery, a tool electrode is positioned near a metal workpiece, with a small gap between them, and then electrical discharges, i.e., sparks, are made to pass between the tool electrode and workpiece while, at the same time, the tool electrode is advanced into the workpiece. The workpiece is thus eroded and the form of the tool electrode is reproduced in it. The desired machining contour is obtained by providing a predetermined shape and/or a predetermined movement of the tool electrode. The feed advance of the electrode is so controlled by a servo-device that, during erosion, the metal workpiece and the tool electrode are always spaced apart by a small gap, which will hereinafter be called the work gap. A liquid or gaseous flushing medium for the cooling, removal or washing-away of the products of erosion, and for the de-ionization of the spark gap is caused to flow in the work gap. Electrical power pulses, for forming the sparks, are produced by generators which are appropriately adjusted, to control the erosion process, as regards various variable parameters such as current, voltage, repetition frequency, pulse duty ratio, and interval between the pulses. Further control of the process may be exercised by, for example, choosing particular pairings of the materials of the tool electrode and of the workpiece, and the liquid or gaseous flushing medium. These parameters can be set either by an operator or by a numerical control system. The relative movement between the tool electrode and the work electrode may also be brought about either manually or, normally, by a control circuit. Suitable control circuits are described in U.S. Pat. No. 3,830,996, and U.S. Pat. No. 3,822,374; methods of monitoring and regulating for optimum erosion are described in U.S. Pat. No. 3,859,186 and U.S. application Ser. 527,889, filed Nov. 27, 1974, now U.S. Pat. No. 3,975,607, all assigned to the assignee of this application. The tool electrode may, as in the case of the invention to be described, be in the form of wire or strip of any suitable cross-sectional shape. The wire-form or strip-form tool electrode is continuously renewed at the actual point of erosion by unwinding from a supply reel. The cross-sectional area of the tool electrode may be from 0.1 mm$^2$ to 2 mm$^2$, for example, and is therefore flexible, i.e., it is capable of yielding and vibrating in the manner of the string of a musical instrument. During the erosion process, the tool electrode is acted on by forces which cause it to undergo deflections and vibrations. Recent investigations made by the applicants have given further information on the manner in which these forces are set up and act. It has been found that the forces produced by disruptive discharges or sparking in the work gap are proportional to the erosion performed. Thus, the deflection of the tool electrode, which has reactions on the machining accuracy, is also proportional to the extent of erosion. An attempt to increase or improve the erosion performance therefore necessarily results in inadmissible deflections or vibrations of the tool electrode and hence in instabilities of the erosion process, in lower or poorer accuracy of machining and even in short-circuiting of the wire or tool electrode to the workpiece, so that the erosion process is prematurely terminated. Owing to the prime importance of the stability of the erosion process, the operation has hitherto been carried out with a low erosion performance or with poor accuracy of machining, as a compromise solution.

Accordingly, it is an object of the invention to reduce spurious movement of the tool electrode, and hence increase machining accuracy, by means other than reducing speed and performance of erosion.

BRIEF DESCRIPTION OF THE INVENTION

The electrical discharge erosion machine tool has a pair of supporting and connecting means, typically rollers, for supporting and tensioning an elongate flexible tool electrode and for making an electrical connection to the tool electrode, and electrical supply means which is connected to said supporting and connecting means and which is further connectable to a metallic workpiece to be machined. In operation, electrical discharges are set up across a workgap between the tool electrode and the workpiece. Controlled relative movement between the tool electrode and workpiece then results in electrical discharge erosion machining of the workpiece. In accordance with the invention, an electrical compensating signal is applied to the tool, or wire electrode or passed between the tool, or wire electrode and the workpiece. A compensating signal supply means provides energy which produces between said tool electrode and said workpiece forces of such nature that spurious movements of the tool electrode, which movements occur as a result of forces associated with the erosion machining, are reduced.

The compensating signal is generated in a supply generator whose output magnitude, i.e., voltage, and/or current; and/or, if alternating, its frequency can be controlled.

In accordance with one embodiment, the output of the compensating signal supply means is connected to respective connecting means of the tool electrode through decoupling means, e.g. diodes and/or resistors.

In accordance with another embodiment, operating power is coupled to said two supporting and connecting means by being connected to a center tap of a transformer, the pair of supporting and connecting means being connected to the end terminals thereof. Compensating current is supplied to the primary of the transformer.

In both of these embodiments, the compensating signal supply means is constructed and arranged to supply a compensating current signal which flows through said tool electrode to form, in said working gap, a controllable electromagnetic field, for example said field may be an alternating field of controllable magnitude and frequency.

In another embodiment, the compensating signal supply has one of two output conductors connected to said supporting and connecting means for making connection with said tool electrode and the other output conductor connected to the workpiece, with suitable decoupling devices. In this embodiment, the compensating signal supply means is constructed and arranged to supply a compensating voltage signal between said tool electrode and said workpiece to form, in said working gap, a controllable electric field, preferably an alternating field of controllable magnitude and frequency.

DESCRIPTION OF THE DRAWINGS

For a better understanding of the invention, and to show how the same may be carried into effect, reference will now be made, by way of example, to the accompanying drawings, in which:

FIGS. 1, 2 and 3 are simplified diagrams of respective combinations of a tool electrode and support means therefor, a workpiece, and an electrical supply circuit connected to the tool electrode and workpiece;

DETAILED DESCRIPTION

Figure 3:
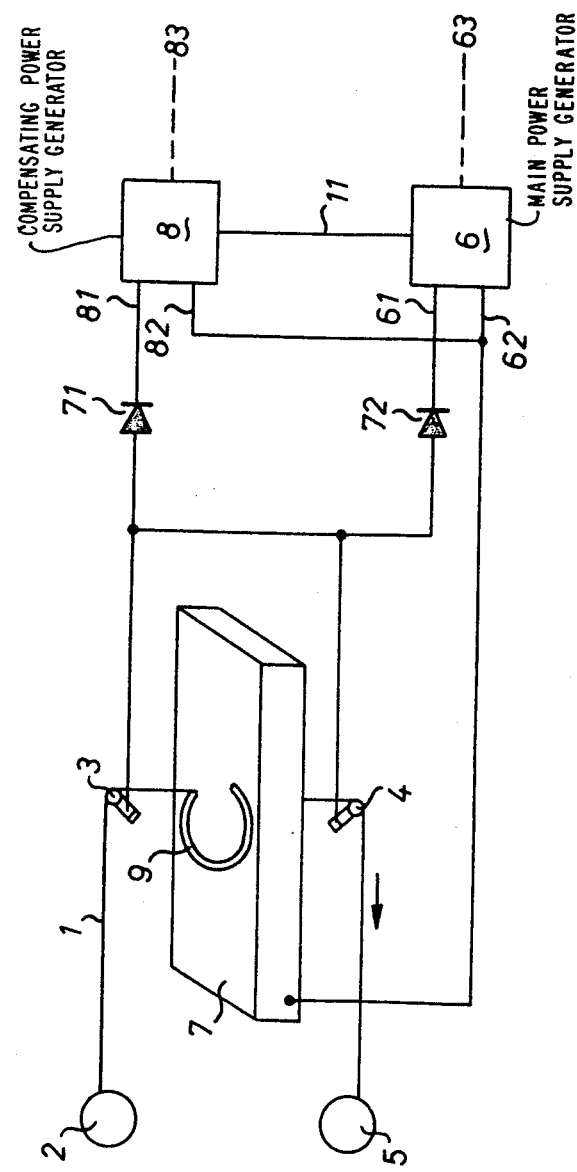

In accordance with FIG. 1, the wire electrode 1 is unwound from the supply reel 2 and passed over the rollers 3, 4 of a holding device (not shown) and tensioned, and thereafter wound on to a take-up reel 5. The holding device is not particularly illustrated. Various examples of the construction of holding devices for, for example, wire-form workpiece electrodes are illustrated and described in U.S. Pat. No. 3,891,819, assigned to the assignee of this application. These types of holding devices may be employed in FIG. 1 of the present invention. In the embodiment illustrated in FIG. 1, the rollers 3 and 4 tension the wire electrode in the manner of the string of a musical instrument. In addition, the rollers 3, 4 form current supply elements for tool, or wire electrode 1. Operating voltage and current are supplied to rollers 3, 4 from a main electrical power generator 6, to pass to the tool electrode 1 and further to the workpiece 7. Workpiece 7 forms effectively an electrode and hence will be called the "workpiece electrode" in the remainder of this description. Current is supplied in pulses from the generator 6 which is well known; it is described, for example, in U.S. Pat. Nos. 3,292,040; 3,492,530; and 3,655,937, all assigned to the assignee of this application. One output 61 of the generator is connected to the two current supply conductors 3, 4 for the wire electrode 1 through decoupling diodes 71, 72 and decoupling resistors 73, 74. The decoupling diodes 71, 72 are arranged in the manner illustrated when the erosion generator 6 supplies bipolar pulses to the work gap between the tool electrode 1 and the workpiece electrode 7. When only unipolar pulses are generated, the decoupling diodes may be arranged so as to have only one forward direction. When tool electrodes of relatively large diameter are employed, in which the voltage drop produced by the compensating current between the current supply conductors 3, 4 is sufficiently small, the diodes 71, 72 may be entirely omitted. However, the decoupling resistors 73, 74 should remain in the connecting conductor in all circumstances. The other output 62 of the erosion generator 6 is directly coupled to the workpiece electrode 7. During the erosion process, the wire electrode 1 travels in the direction of the arrow from the supply reel 2 through the work gap to the take-up reel 5. In this way, the wire electrode is continuously renewed. Of course, the wire electrode may also be moved in the other direction. By suitable contouring control, the relative movement between the two electrodes 1, 7 is made such that the desired cuts or workpiece contours 9 are produced.

It has been found that various forces act on the tool electrode 1 during the erosion process in the work gap as the result of (a) the electric field between the two electrodes 1, 7, due to voltages therebetween, (b) the electromagnetic field around the wire electrode 1, due to current flow therethrough, (c) the spark discharges, and (d) the bubble formation in the dielectric medium upon the passage of a discharge. These forces, together termed the erosion forces, form a resultant force and produce deflections and vibrations of the tool electrode 1. These vibrations result in instabilities of the erosion process and even in short-circuits between the wire, or tool electrode 1 and the workpiece electrode 7.

In accordance with the invention, and in order to eliminate the vibrations due to the erosion forces, there is provided a compensating power supply in form of a circuit arrangement 8 whose output 81 is directly connected to the roller 3 forming a current supply. The other output 82 is connected to the other roller 4 forming another current supply for the tool electrode 1. During the erosion process, the circuit arrangement 8 acts in such a manner that a compensating current (direct current or alternating current) flows through the tool electrode 1 to thereby compensate the forces acting between electrodes 1 and 7 during operation. The force exerted by the electromagnetic field surrounding the tool electrode 1 tends to decrease vibrations, and it is here utilized to eliminate vibrations of the tool electrode 1. The circuit arrangement 8 controls during the erosion process (1) the magnitude and/or (2) the frequency (if it is alternating) of the compensating current flowing through the conductors 81, 82, the current supply rollers 3, 4 and the tool electrode 1. The compensating current is adjusted either manually in the circuit arrangement 8 or by a numerical control system and/or optimizing systems such as those more particularly described in the U.S. Pat. No. 3,859,186 referred to above. Control signals are applied over conductor 83, shown in broken lines. The erosion generator 6 receives its control parameters such as current, voltage, repetition frequency, pulse duty factor, interval between the pulses, and so on, either through the input conductor 63 from the same numerical control systems or optimizing systems, or by manual adjustment at the generator itself, as known and described in the aforementioned Patents.

FIG. 2 illustrates a further example of the connection of the circuit arrangement 8 for compensating the erosion forces arising during erosion. Similar component parts which are the same as in FIG. 1 are therefore denoted by the same reference numerals and only the differences in the circuit compensating current connection of generator 8 will therefore be described in the following. The erosion generator 6 has its output 61 connected to the two current supply conductor rollers 3, 4 of the tool electrode 1 through the secondary winding 110 of a transformer 10. The output 61 leads to a center tap of the secondary winding 110 to avoid feedback of the compensating current on the circuit arrangement 8. The compensating current generator forming the circuit arrangement 8 has its two outputs 81, 82 connected to the primary winding 12 of the transformer 10 to thereby pass its alternating current output through the current supply conductor rollers 3, 4 to the tool electrode 1. In this way, the erosion forces are compensated for in the same way as in the embodiment illustrated in FIG. 1. The strength and the frequency of the compensating current are adjusted in the circuit arrangement either manually or by way of the control conductor 83 by means of a numerical control system or by an optimizing system. In the embodiments illustrated in FIGS. 1 and 2, the circuit arrangement 8 produces an alternating current for compensating for the erosion forces, the frequency of which being sufficiently different from the resonance frequency of the tool electrode 1.

FIG. 3 illustrates a further embodiment of the connection of the circuit arrangement 8. Parts already referred to in the description of FIGS. 1 and 2 bear the same reference numerals. In accordance with FIG. 3, one conductor 81 of the circuit arrangement 8 is connected to the current supply conductor rollers 3 and 4. It is sufficient for the circuit arrangement 8 to be connected to only one of the two current supply conductor rollers 3 and 4 by means of the output conductor 81. The other output conductor 82 of the circuit arrangement 8 is connected to the output conductor 62 of the erosion generator 6. Decoupling diodes 71, 72 are inserted in the conductors 81 and 61 as shown. The circuit arrangement 8 supplies a compensating voltage (unidirectional voltage or alternating voltage) between the two electrodes 1 and 7. The magnitude and/or the frequency (if it is alternating) of the compensating voltage is set at the circuit arrangement 8 either manually or by way of the control conductor 83 by a numerical control system or by an optimizing system. A synchronizing conductor 11 between the erosion generator 6 and the circuit arrangement 8 for compensating for the erosion forces in the work gap 9 is provided to synchronize the compensating voltage in relation to the working voltage in the work gap. The erosion generator 6 applies pulses in known manner through the conductors 61 and 62 to the work gap between the two electrodes 1 and 7. The circuit arrangement 8 applies the compensating voltage, for example during the intervals between the erosion pulses, to the work gap 9 through the conductors 81, 82. The compensating voltage may alternatively be provided for a particular group of pulses from the erosion generator. In this case, the magnitude of the compensating voltage may vary. Synchronization between the circuit arrangement 8 and the erosion generator 6 then must be provided and is effected by way of the line 11. The compensating voltage is so applied to the work gap 9 of the two electrodes 1, 7 that the tool electrode 1 does not undergo resonant vibrations.

Figure 4:
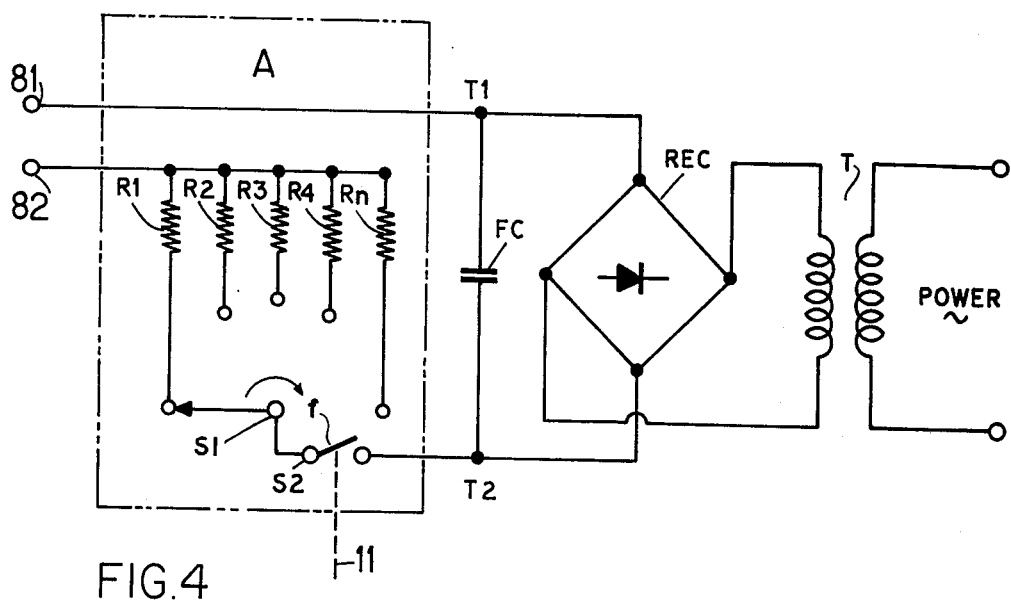
FIG. 4 is a basic functional diagram of a compensating signal supply means used in an explanation of the method of control.

The compensating power applied by the circuit arrangement 8 (FIG. 4) can be controlled in various ways. Referring now to FIG. 4: Power, for example from a network line at commercial power voltage and frequency is transformed in transformer T and rectified in a diode rectifier network REC and filtered in capacitor FC; voltage of suitable value is then available at terminals T1 and T2. Terminal T2 is connected through a first switch S2 to a second switch S1 which can, selectively, connect any one of resistors R1, R2, R3 ... Rn in circuit with line 82. Line 81 (FIGS. 1—3) is directly connected to the terminal T1. Assume switch S2 to be closed. Selectively engaging one of the resistors R1 ... Rn permits control of power applied to lines 81, 82. Both switches S1, S2, shown in FIG. 4 as mechanical switches, can be replaced by electronic switches; switch S2, particularly, can be a rapidly operating electronic switch which interrupts application of selected current at a frequency $f$ as indicated by the double arrow. Switch S2 can also be used to synchronize application of power to lines 81, 82, as explained in detail in connection with FIG. 3, by being controlled to open or close from line 11, as indicated schematically by the broken line connection thereto. If switch S2 is open, compensating power is disconnected from the system.

During spark erosive treatment, forces between the workpiece and the wire, or ribbon electrode arise which tend to bend the tool electrode away from the workpiece due to the explosion-like discharge. These forces are not uniform, in time; hence, the bend in the tool electrode will vary.

The electrical voltage between the tool electrode 1 and the workpiece 7, due to the power supply 6, results in electrostatic fields. These fields are proportional to the square of the voltage and tend to attract the tool electrode and the workpiece. Current flows in the tool electrodes. Thus, upon cutting of ferromagnetic material, electromagnetic fields will likewise arise which are proportional to the square of the current and likewise result in attraction between the tool electrode and the workpiece. The action of electrostatic and electromagnetic fields is well known and basic to electrical technology. These forces act counter to the erosion forces, tending to decrease the bending of the wire away from the workpiece.

The various erosion forces and the fields resulting due to the voltage across the gap, as well as the current flowing through the tool electrode, are not self-compensating, nor are they constant and uniform. The compensating power applied by lines 81, 82 to the tool electrode so modifies the fields already due to the voltages and currents resulting from the working process itself that, overall, the forces acting on the tool electrode are effectively compensated.

The voltages and currents provided, and necessary for compensation, can be determined by first making measurements of variations of the fields and then computing the necessary compensating currents or voltages; they are then stored, for example in a numerical control system, or in an optimization system. These numerical machine tool control systems store, as customary in spark erosion systems, information relative to spark frequency, gap voltage, discharge current, and the like. There is no fixed theory regarding the required compensation voltages or currents, respectively, and the actual compensation currents and voltages, their magnitude and frequency, if of alternating nature, will depend on many parameters; primarily, the relationship will depend on the material of the workpiece, its size, the thickness thereof, and the like, and is best determined experimentally and then stored in the numerical control system. The results of these investigations can be tabulated; they can be stored in the same numerical control system which controls operation of the erosive process itself to additionally control the compensating currents and voltages, both with respect to magnitude as well as frequency, including a frequency of zero, so that effective compensation is obtained.

Example: A workpiece of steel material and having a thickness of 30 mm was subjected to cutting, for example as schematically illustrated in FIG. 1 with respect to workpiece 7, by a wire electrode of 0.2 mm diameter. Power of 400 volts, with a peak pulse current of 90 amps and average current of 3 amps was applied between the workpiece and to the tool electrode 1. The speed of feed was 0.5 mm/min. The tool electrode operated in a gap which was maintained by a servo system at approximately 0.3 mm slot width.

To compensate for field distortion, a compensating current of $\approx$ 20 amps was applied to the electrode in accordance with a system of FIG. 2. The compensating current had a frequency of $\Lambda$500 Hz.

With the same conditions as above, but using a non-ferromagnetic workpiece, a voltage was supplied to the gap, in accordance with the system of FIG. 3 of $\Lambda$00 V, at a frequency of 30 kHz.

Figure 5:
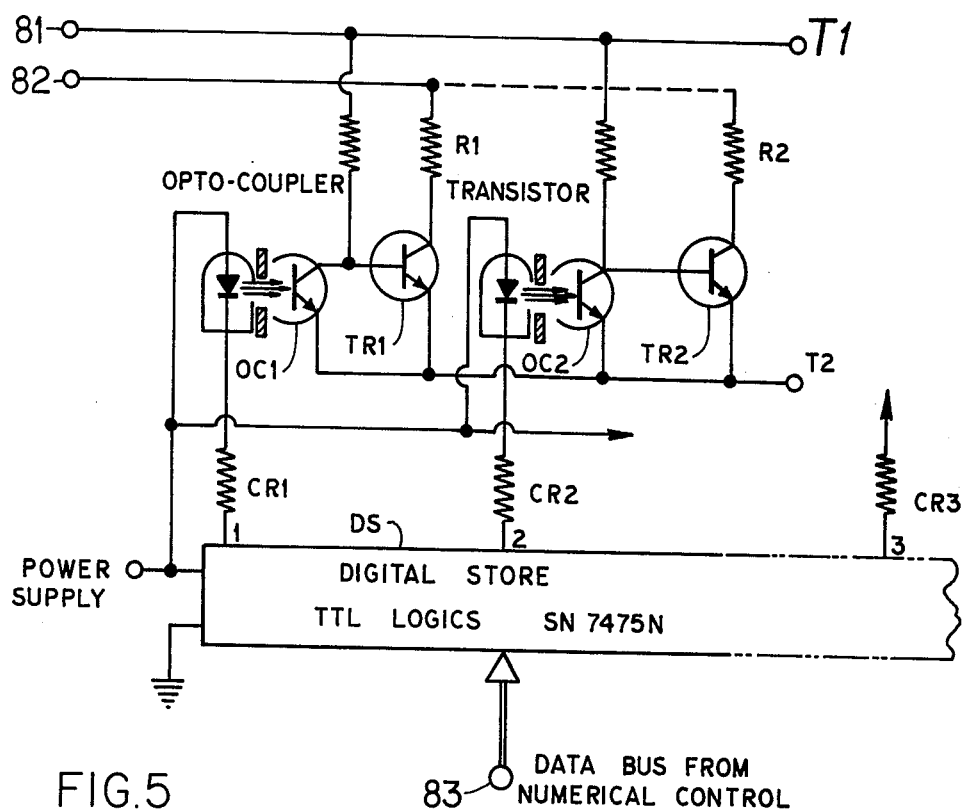
FIGS. 5 to 7 are schematic functional circuit diagrams illustrating basic structures useful in carrying out the method.

The basic circuit of FIG. 4 enclosed within the chain-dotted rectangle A can be expanded, as illustrated in FIG. 5. Switch S1 has been replaced by transistors TR1, TR2; further transistors for further resistors have not been shown and their connection will be obvious. The transistors themselves are controlled by opto-electronic couplers OC1, OC2 in order to provide complete voltage isolation. The opto-electronic couplers OC1, OC2 are connected to a digital store, for example a TTL logic of the type SN 7475 N (Intel). The digital store DS is coupled to the opto couplers through coupling resistors CR1, CR2 ... CRn respectively. The digital store DS is connected to the data bus 83 (FIGS. 1–3) to receive signals from a numerical machine tool control system. The operation of this circuit is, in all respects identical to that disclosed basically in connection with FIG. 4.

Figure 6:
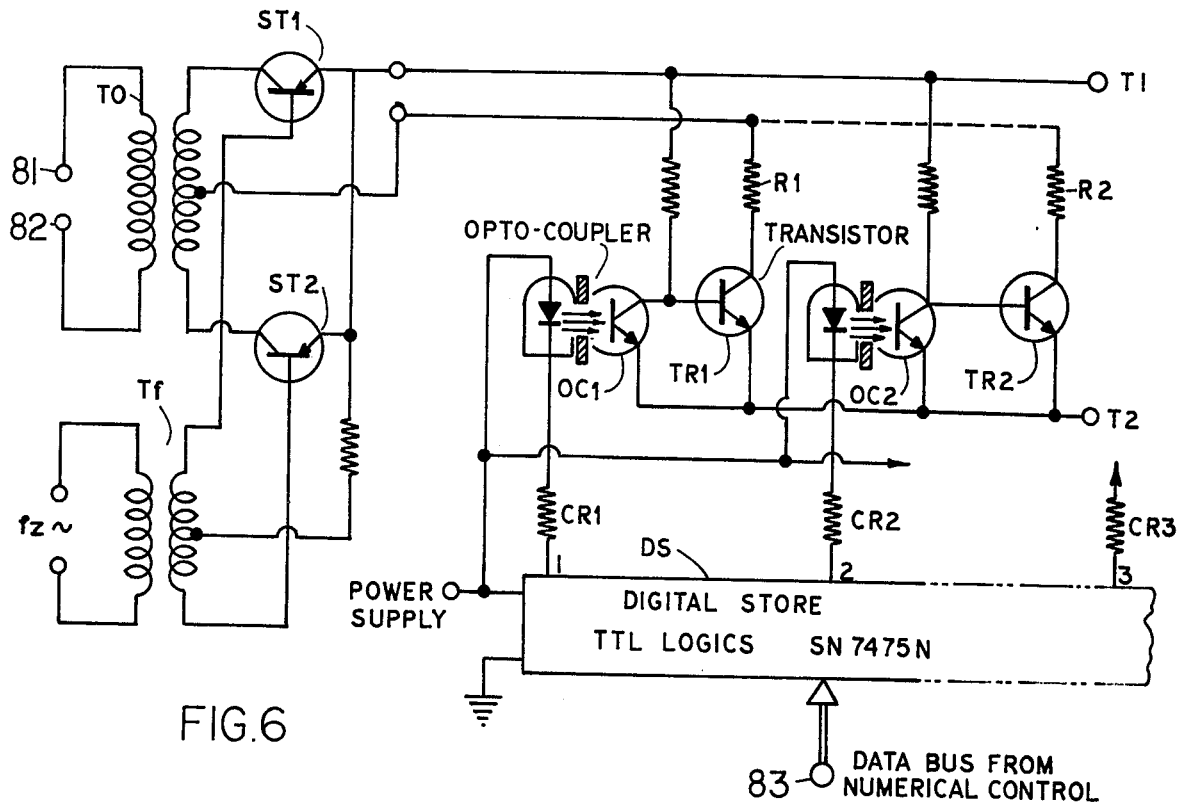

FIG. 6 is similar to FIG. 5, except that, additionally, a transistor chopper circuit is provided so that the lines 81, 82 will have an alternating current applied thereto. The chopper frequency Fz, and corresponding for example to the frequency of closure $f$ of switch S2 (FIG. 4), can be derived directly within the unit 8 from a standard oscillator, or can be externally controlled. The frequency will depend on the various parameters aforesaid and, in addition, on the flushing fluid, tension of the electrode, its material, and various parameters. The vibrating frequency of the electrode, absent any compensating current can be readily determined under given operating conditions, and a compensating frequency can then be applied. The transistor chopper includes switching transistors ST1, ST2, an output transformer TO and a second transformer to introduce the switching frequency Tf.

Figure 7:
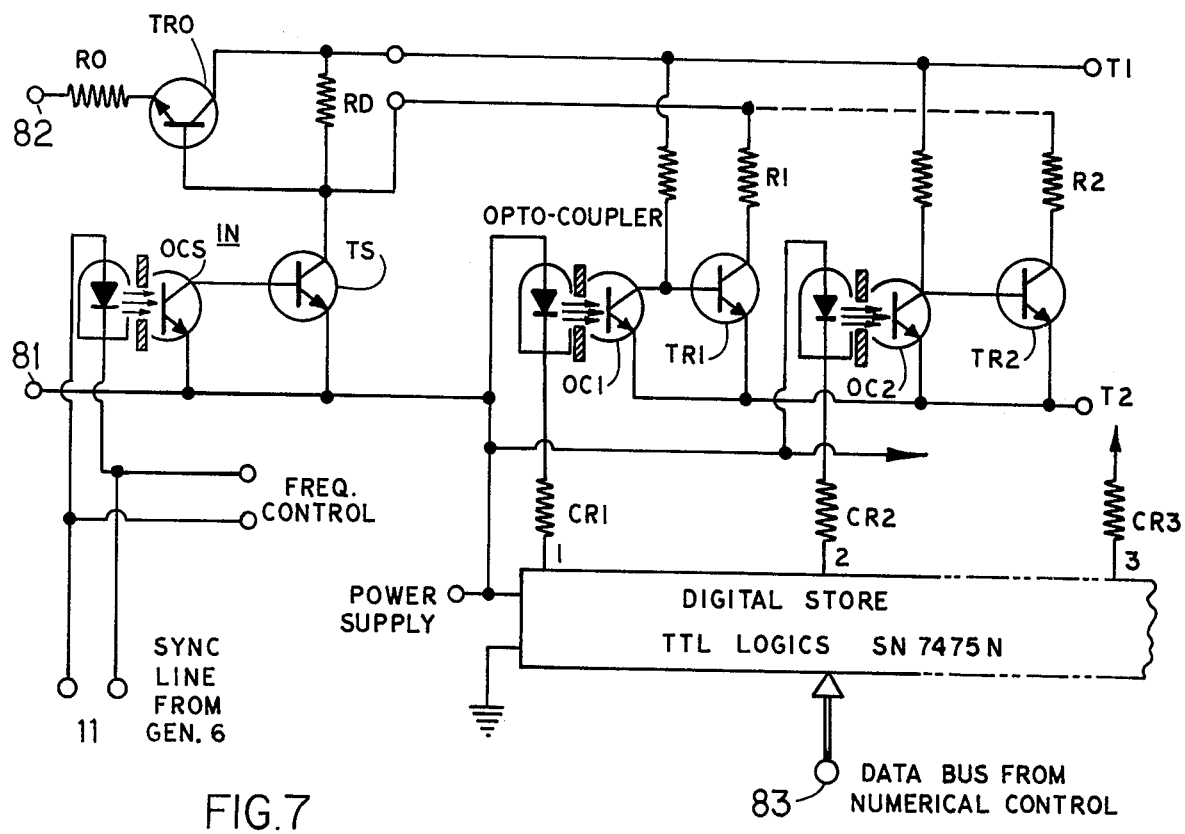

FIG. 7 illustrates a circuit to control the voltage, and would be used, for example, in the embodiment of FIG. 3. The resistors R1, R2 ... Rn are combined with a resistor $R_D$ to form a voltage divider. The voltage arising at the junction point of the voltage divider is coupled out by an emitter-follower output transistor TRO and an output coupling resistor RO. FIG. 7 illustrates a further transistor TS to provide for synchronization, controlled by an optical coupler OCS which, in turn, is controlled by synchronization signals from line 11, connected to generator 6, or to a frequency control, for example a suitable source of variable frequency. The signals on line 11 from generator 6 will be of such a nature that the optical coupler OCS is disabled, so that output coupling transistor TRO is turned OFF during presence of sparking, that is, during a pulse from generator 6. Thus, the operating voltage of the pulse generator not interfered with by additional compensating voltage occurring during the pulse applied from the power generator 6 itself.

Control of the compensating power, as illustrated, was effected digitally by the digital store DS. Any other power amplifier may be used, for example a power amplifier similar to that in the final stages of high-fidelity power equipment, as well known in radio, phonograph, and other audio-reproducing equipment. The data bus 83 from the numerical control then must be conducted through a digital-analog converter to provide analog signals to such a power amplifier.

Various changes and modifications may be made, and features described in connection with any one of the embodiments may be used with any of the others, within the inventive concept.

For a detailed discussion of the various forces acting on a wire, strip or ribbon electrode in electro-erosive machining operations, reference is made to an article by co-inventor Panschow in "VDI-Zeitschrift" ("Journal of the Society of German Engineers"), vol. 118, 1976, No. 1 (January), pages 13–17, entitled "Effect of Forces Occurring in Spark-Erosive Cutting".

We claim:

1. In an electro-erosion machining method, which includes the steps of controlling movement of a wire, ribbon or strip-like tool electrode (1) with respect to a workpiece (7) while leaving a spark gap (9) between the electrode and the workpiece, and while supplying electrical power to the spark gap, the step of
supplying a compensating electrical current to the tool electrode (1) to generate an electromagnetic compensating field which generates forces acting on the electrode of a magnitude and direction which compensate uncontrolled disturbance and distortion forces acting on the tool electrode during operation.

2. Method according to claim 1 wherein the step of supplying electrical current to generate said compensating field comprises the step of controlling at least one of: the level of current intensity; the frequency of the compensating current.

3. In an electro-erosion machining method, which includes the steps of controlling movement of a wire, ribbon or strip-like tool electrode (1) with respect to a workpiece (7) while leaving a spark gap (9) between the electrode and the workpiece, and while supplying electrical power to the spark gap, the step of
supplying a compensating voltage to the tool electrode (1) to generate an electric compensating field which generates forces acting on the electrode of a magnitude and direction which compensate uncontrolled disturbance and distortion forces acting on the tool electrode during operation.

4. Method according to claim 3 wherein the step of supplying the compensating voltage to generate the compensating field comprises the step of controlling at least one of: the level of the compensating voltage; the frequency of the compensating voltage.

5. Electro-erosion apparatus comprising a tool electrode (1) located in close proximity to a workpiece (7) while leaving a gap (9) therefrom;

power supply means (6) supplying electrical energy to the gap to effect removal of the material of the workpiece by electro-erosive action;

means (3, 4) supporting the tool electrode (1) in stretched condition;

and means (8; 81, 82) to compensate operating forces acting on the tool electrode tending to have the effect of uncontrolled disturbance and distortion including at least one of: deflection, or vibration of the tool electrode under operating conditions, said means comprising compensating electrical power supply means (8) connected to the tool electrode (1) and providing electrical energy thereto of such magnitude and direction that a field is generated which acts on the tool electrode to compensate the effect of said operating forces.

6. Apparatus according to claim 5, wherein said compensating power supply means (8) is connected to the tool electrode support means (3, 4) to generate an electromagnetic compensation field, the power supply means (6) being connected to at least one of said tool electrode support means and to the workpiece, respectively;

and decoupling means (71, 72; 73, 74) decoupling the connections from the compensating power supply means and the electrical energy power supply means (6) from each other.

7. Apparatus according to claim 5, further comprising a transformer (10) having the end terminals of its secondary connected to respective tool electrode support means (3, 4), the compensating power supply means (8) being connected to the primary of said transformer to generate an electromagnetic compensation field due to current flow of compensating current derived from said compensating power supply being applied to the tool electrode (1);

and means (61) connecting the electrical energy power supply means (6) to a center tap of the transformer (10) to supply electro-erosive power to the electrode.

8. Apparatus according to claim 5, wherein the compensating power supply means (8) has one terminal (81) connected to at least one of said tool electrode support means (3, 4), the other terminal (82) thereof being connected to the workpiece (7) to generate an electrical compensation field in the gap (9) between the tool electrode (1) and the workpiece (7) and acting on the tool electrode to compensate for said disturbance and distortion effects, the electrical energy power supply means (6) being connected with its respective terminals to the tool electrode (1) and to the workpiece (7), respectively;

and decoupling means (71, 72) interposed in the respective connections from at least one of said power supply means and decoupling the respective power supply means (6,8) from each other.

9. Apparatus according to claim 5, wherein the compensating power supply means (8) includes adjustment means (S1) controlling the amplitude of electrical power being supplied to said electrode.

10. Apparatus according to claim 5 wherein the compensating power supply means includes adjustment means (S2) controlling the frequency of the compensating power being applied to the tool electrode (1).

11. Apparatus according to claim 5, wherein the compensating power supply means includes adjustment means (S1) controlling the voltage of the compensating power applied to the electrode, and generating an electrical field in the gap (9) between the tool electrode (1) and the workpiece (7).

12. Apparatus according to claim 11, further comprising means (S2) controlling the frequency of the voltage applied between the tool electrode (1) and the workpiece (7).

13. Apparatus according to claim 5, further including synchronization means (11; OCS, TS) connected between said electrical energy power supply means (6) and the compensating power supply means (8) to synchronize application of compensating power to the tool electrode with pulse gaps of energy supplied by said electrical energy power supply means (6).

14. Apparatus according to claim 5, wherein said apparatus includes numerical machine tool control storage means (DS) storing data relating to operation of said apparatus;

and wherein said storage means further comprises readout means (CR1, CR2, CR3...) connected to and controlling said compensating power supply means (8) to control at least one of: magnitude of power; frequency of power being supplied by said compensating power supply means to the tool electrode, whereby said storage means will store operating commands for said apparatus and additionally store compensating power control data, and apply said compensating power control data to said compensating power supply means.

* * * * *